(12) United States Patent
Ikeda et al.

(10) Patent No.: US 12,049,021 B2
(45) Date of Patent: Jul. 30, 2024

(54) METHOD FOR MANUFACTURING BUILDING MATERIAL

(71) Applicant: NICHIHA CORPORATION, Nagoya (JP)

(72) Inventors: Satoshi Ikeda, Nagoya (JP); Kazuhisa Yoshida, Nagoya (JP); Hidenori Nishioka, Nagoya (JP); Akihiro Sugimoto, Nagoya (JP)

(73) Assignee: NICHIHA CORPORATION, Nagoya (JP)

( * ) Notice: Subject to any disclaimer, the term of this patent is extended or adjusted under 35 U.S.C. 154(b) by 171 days.

(21) Appl. No.: 17/959,498

(22) Filed: Oct. 4, 2022

(65) Prior Publication Data

US 2023/0043291 A1 Feb. 9, 2023

Related U.S. Application Data

(62) Division of application No. 16/497,308, filed as application No. PCT/JP2018/033321 on Sep. 7, 2018, now Pat. No. 11,504,880.

(30) Foreign Application Priority Data

Sep. 30, 2017 (JP) ................. 2017-192260

(51) Int. Cl.
*B32B 13/00* (2006.01)
*B28B 1/52* (2006.01)
(Continued)

(52) U.S. Cl.
CPC .............. *B28B 1/52* (2013.01); *C04B 14/18* (2013.01); *C04B 14/20* (2013.01); *C04B 14/38* (2013.01);
(Continued)

(58) Field of Classification Search
CPC .................................................... B32B 13/00
See application file for complete search history.

(56) References Cited

U.S. PATENT DOCUMENTS

| 4,194,946 A | 3/1980 | Ootani et al. |
| 5,681,428 A * | 10/1997 | Nakajima ............... D21J 1/08 |
| | | 162/120 |

(Continued)

FOREIGN PATENT DOCUMENTS

| JP | 62-23489 A | 1/1987 |
| JP | 4-37505 A | 2/1992 |

(Continued)

OTHER PUBLICATIONS

International Search Report for International Application No. PCT/JP2018/033321, dated Nov. 20, 2018, with English translation.

(Continued)

*Primary Examiner* — Larry W Thrower
*Assistant Examiner* — John W Hatch
(74) *Attorney, Agent, or Firm* — Birch, Stewart, Kolasch & Birch, LLP

(57) ABSTRACT

[Object] To provide a building material having excellent durability.
[Solution] A building material has a convex part formed on a surface thereof, the convex part including a first lateral surface part and a second lateral surface part corresponding to the first lateral surface part. The building material is formed from a mixture containing a hydraulic material, an admixture, and a plant-based reinforcing material, and the plant-based reinforcing material at least in the convex part is distributed in the mixture with the hydraulic material and the admixture attached to the plant-based reinforcing material. A distribution of the plant-based reinforcing material in the first lateral surface part and a distribution of the plant-based reinforcing material in the second lateral surface part are (Continued)

substantially the same. Desirably, the convex part includes a first edge part that is an edge part of the first lateral surface part and a second edge part that is an edge part of the second lateral surface part and that corresponds to the first edge part, and a distribution of holes formed in the first edge part and a distribution of holes formed in the second edge part are substantially the same.

2 Claims, 8 Drawing Sheets

(51) Int. Cl.
*C04B 14/18* (2006.01)
*C04B 14/20* (2006.01)
*C04B 14/38* (2006.01)
*C04B 16/08* (2006.01)
*C04B 18/06* (2006.01)
*C04B 18/10* (2006.01)
*C04B 40/00* (2006.01)
*E04F 13/14* (2006.01)

(52) U.S. Cl.
CPC ............ *C04B 16/08* (2013.01); *C04B 18/061* (2013.01); *C04B 18/10* (2013.01); *C04B 40/0042* (2013.01); *C04B 40/0046* (2013.01); *E04F 13/14* (2013.01)

(56) References Cited

U.S. PATENT DOCUMENTS

| | | | |
|---|---|---|---|
| 6,176,920 B1 * | 1/2001 | Murphy | B32B 13/12 |
| | | | 106/676 |
| 2009/0243149 A1 | 10/2009 | Yamazaki et al. | |
| 2011/0198785 A1 * | 8/2011 | Kester | B28B 5/027 |
| | | | 425/72.1 |
| 2014/0000489 A1 | 1/2014 | Ikeda et al. | |

FOREIGN PATENT DOCUMENTS

| | | |
|---|---|---|
| JP | 7-124926 A | 5/1995 |
| JP | 2012-96944 A | 5/2012 |
| JP | 2017-7229 A | 1/2017 |
| JP | 2017-193181 A | 10/2017 |

OTHER PUBLICATIONS

Written Opinion of the International Searching Authority for International Application No. PCT/JP2018/033321, dated Nov. 20, 2018.

* cited by examiner

METHOD FOR MANUFACTURING BUILDING MATERIAL

CROSS-REFERENCE TO RELATED APPLICATIONS

This application is a Divisional application of co-pending application Ser. No. 16/497,308, filed on Sep. 24, 2019, which is the National Phase under 35 U.S.C. § 371 of International Application No. PCT/JP2018/033321, filed on Sep. 7, 2018, which claims the benefit under 35 U.S.C. § 119(a) to Patent Application No. 2017-192260, filed in Japan on Sep. 30, 2017, all of which are hereby expressly incorporated by reference into the present application.

TECHNICAL FIELD

The present invention relates to a method for manufacturing a building material.

BACKGROUND ART

Examples of building materials of buildings include inorganic boards such as fiber reinforced cement siding boards and ceramic boards.

As a method for manufacturing an inorganic board, Patent Literature 1 describes a so-called dry manufacturing method in which a building mat is formed while scattering powder raw materials onto a receiver and causing the powder raw materials to accumulate starting with fine powder raw materials.

In the dry manufacturing method, a forming device such as that shown in FIG. 11 is used. The device of FIG. 11 includes a forming chamber A provided with a conveying belt conveyor B at a bottom portion and a supplying belt conveyor D at a top portion. A template C having a concavo-convex pattern is disposed on a surface of the conveying belt conveyor B and is conveyed by the conveying belt conveyor B. Inside the forming chamber A, a main fan E is disposed in a conveying direction of the template C, and, inside the forming chamber A, wind is blown in a direction opposite to the conveying direction of the template C. Further, a sifting frame F is also disposed inside the forming chamber A.

In the device of FIG. 11, the powder raw materials in which, for example, cement and a wood reinforced material are mixed fall into the forming chamber A via the supplying belt conveyor D. By blowing air against the powder raw materials that have fallen by using the main fan E, very fine powder raw materials are supplied in a direction opposite to a conveying direction X1. Since the powder raw materials against which the air has been blown are sifted by the sifting frame F, the fine powder raw materials fall and accumulate on the template C on an upstream side in the conveying direction X1, and any coarse powder raw materials remaining on the sifting frame F fall and accumulate on the template C on a downstream side in the conveying direction X1.

In this way, a mat having a structure in which particle sizes decrease towards the bottom is formed on the template C. A lower side of the mat is a surface, and a concavo-convex portion originating from the template C is formed on the surface.

However, as shown in FIG. 12, in the forming device of the related art, convex parts having the concavo-convex pattern of the template become barriers to the wind that is blown from the main fan and an opposite side N of each template convex part C1 that is opposite to the conveying direction X1 is not easily filled with fine powder raw materials, as a result of which a problem that coarse powder raw materials are exposed on the lower side of the mat and a rough surface is formed occurs.

Therefore, Patent Literature 1 discloses a different building material manufacturing device shown in FIG. 13. It is disclosed that, in the building material manufacturing device shown in FIG. 13, an auxiliary fan G that blows wind in the conveying direction X1 of the template C is disposed and wind is also blown from an opposite side to also fill the opposite side of each template convex part C that is opposite to the template conveying direction X1.

However, in recent years, the pattern is required to have depth and to be diverse, and it is becoming difficult to sufficiently cover the opposite side N of each template convex part C that is opposite to the conveying direction X1 with fine powder raw materials by only using the auxiliary fan G.

In order to improve the performance of the inorganic board that is acquired, a piece of wood is used. However, the piece of wood has low bulk specific gravity, and a hydraulic material, such as cement, has high bulk specific gravity. Therefore, in a classification using wind, the raw materials may not accumulate uniformly due to differences in the bulk specific gravities of the raw materials.

Specifically, since the hydraulic material has high bulk specific gravity and is not easily blown away by a large distance, the hydraulic material tends to accumulate on a conveying-direction side M of each convex part of the template C. On the other hand, since the piece of wood has low bulk specific gravity, the piece of wood is blown away by a large distance, and since the piece of wood is blown by the wind from the auxiliary fan G, the piece of wood tends to accumulate on the opposite side N of each convex part of the template C that is opposite to the conveying direction.

Further, since the direction of the wind from the main fan E is opposite to the conveying direction X1 of the template C, the accumulation speed per hour of the powder raw materials that are blown by the wind from the main fan E and that accumulate is increased. On the other hand, since the direction of the wind from the auxiliary fan G is the same as the conveying direction of the template C, the accumulation speed per hour of the powder raw materials that are blown by the wind from the auxiliary fan G and that accumulate is lower than in the case of the main fan.

Therefore, on the opposite side N of each template convex part that is opposite to the conveying direction, the quantity of the piece of wood that accumulates tends to be larger than on the conveying-direction side M of each template convex part and the accumulation amount of the powder raw materials tends to be reduced.

Holes are easily formed between the powder raw materials that have accumulated on the template. Even after a pressing operation in a subsequent step, the holes remain in a portion where a large quantity of the piece of wood accumulates and a portion where a small quantity of the powder raw material accumulates. Since these holes suck water, durability may be reduced.

CITATION LIST

Patent Literature

PTL 1: Japanese Unexamined Patent Application Publication No. 4-37505

SUMMARY OF INVENTION

Technical Problem

The present invention provides a building material having excellent durability.

Solution to Problem

According to a first form of the present invention, a building material is provided. The building material has a convex part formed on a surface thereof, the convex part including a first lateral surface part and a second lateral surface part corresponding to the first lateral surface part. In addition, the building material is formed from a mixture containing a hydraulic material, an admixture, and a plant-based reinforcing material. The plant-based reinforcing material at least in the convex part is distributed in the mixture with the hydraulic material and the admixture attached to the plant-based reinforcing material. In addition, a distribution of the plant-based reinforcing material in the first lateral surface part and a distribution of the plant-based reinforcing material in the second lateral surface part are substantially the same.

In the building material of the first form, since, at the convex part where holes are easily formed, the plant-based reinforcing material is distributed in the mixture with the hydraulic material and the admixture attached to the plant-based reinforcing material, the attached hydraulic material and admixture suppress absorption of moisture of the plant-based reinforcing material and absorption of water of the plant-based reinforcing material to improve the durability of the present building material. In addition, since the plant-based reinforcing material with the hydraulic material and the admixture attached thereto is distributed in the mixture containing the hydraulic material and the admixture, holes are not easily formed between the plant-based reinforcing material and the mixture containing the hydraulic material and the admixture. Therefore, absorption of water of the present building material is suppressed to improve the durability of the present building material.

In addition, at the convex part, the distribution of the plant-based reinforcing material at the first lateral surface part and the distribution of the plant-based reinforcing material at the second lateral surface part are substantially the same. "The distributions are substantially the same" means that, in a predetermined range, the sizes and numbers of holes are the same or close to each other. As described above, since the plant-based reinforcing material with the hydraulic material and the admixture attached thereto is such that absorption of water is suppressed and holes are not easily formed, when, at the convex part, the distribution of the plant-based reinforcing material at the first lateral surface part and the distribution of the plant-based reinforcing material at the second lateral surface part are substantially the same, absorption of water on both sides is suppressed, as a result of which the durability of the present building material is improved.

As described above, the building material according to the first form of the present invention is such that absorption of water is suppressed, and is suitable for realizing excellent durability.

A building material according to a second form of the present invention is based on the first form, and is such that the convex part includes a first edge part that is an edge part of the first lateral surface part and a second edge part that is an edge part of the second lateral surface part and that corresponds to the first edge part and is such that a distribution of holes formed in the first edge part and a distribution of holes formed in the second edge part are substantially the same.

In the building material, the first edge part and the second edge part are locations where holes are most easily formed. Since, at the first lateral surface part and the second lateral surface part of the building material according to the second form, the plant-based reinforcing material with the hydraulic material and the admixture attached thereto has substantially the same distribution in the mixture containing the hydraulic material and the admixture, even at the first edge part and the second edge part, the plant-based reinforcing material with the hydraulic material and the admixture attached thereto has substantially the same distribution in the mixture containing the hydraulic material and the admixture. In addition, since the distribution of holes of the first edge part and the distribution of holes of the second edge part are substantially the same, absorption of water from the first edge part and absorption of water from the second edge part are suppressed, as a result of which the durability of the present building material is improved.

A building material according to a third form of the present invention is based on the first form, and is such that the convex part includes a first edge part that is an edge part of the first lateral surface part and a second edge part that is an edge part of the second lateral surface part and that corresponds to the first edge part and is such that water absorbency of the first edge part and water absorbency of the second edge part are substantially the same.

Even in the first edge part and the second edge part of the building material according to the third form, the plant-based reinforcing material with the hydraulic material and the admixture attached thereto has substantially the same distribution in the mixture containing the hydraulic material and the admixture. In addition, since the water absorbency of the first edge part and the water absorbency of the second edge part are substantially the same, absorption of water from the first edge part and absorption of water from the second edge part are suppressed, as a result of which the durability of the present building material is improved.

A building material according to a fourth form of the present invention is based on the first form, and is such that the convex part includes a first edge part that is an edge part of the first lateral surface part and a second edge part that is an edge part of the second lateral surface part and that corresponds to the first edge part and is such that freeze-thaw durability of the first edge part and freeze-thaw durability of the second edge part are substantially the same.

In the building material, since the first edge part and the second edge part are locations where water is easily absorbed, they are easily subjected to the action of deterioration due to repeated freezing and thawing, that is, a freeze-thaw action. Even in the first edge part and the second edge part of the building material according to the fourth form, the plant-based reinforcing material with the hydraulic material and the admixture attached thereto has substantially the same distribution in the mixture containing the hydraulic material and the admixture. In addition, since the freeze-thaw durability of the first edge part and the freeze-thaw durability of the second edge part are substantially the same, deterioration from the first edge part and the second edge part due to freezing/thawing is suppressed, as a result of which the durability of the present building material is improved.

A building material according to a fifth form of the present invention is based on the first form and is such that the admixture is at least one of coal ash, mica, wollastonite, perlite, and resin bead. Since such an admixture can be attached to the plant-based reinforcing material and can be mixed with the hydraulic material, holes are not easily formed in the building material that is acquired. Coal ash, mica, and wollastonite are suitable for realizing a building material having high strength and excellent dimensional stability, and perlite and resin bead are suitable for realizing a light building material.

According to a sixth form of the present invention, a method for manufacturing a building material is provided. The method for manufacturing a building material includes supplying a powder raw material to a sifting machine including a meshed sieve sheet, the powder raw material containing a hydraulic material, an admixture, and a plant-based reinforcing material with the hydraulic material and the inorganic admixture attached thereto; and by repeatedly pulling and bending the sieve sheet, causing the powder raw material to fall from a mesh of the sieve sheet and to accumulate on a template disposed below the sifting machine. In the sixth form of the present invention, the building material has a convex part formed on a surface thereof, the convex part including a first lateral surface part and a second lateral surface part corresponding to the first lateral surface part. The template includes a concave part for forming the convex part. The plant-based reinforcing material at least in the convex part is distributed in the mixture with the hydraulic material and the admixture attached to the plant-based reinforcing material, and a distribution of the plant-based reinforcing material in the first lateral surface part and a distribution of the plant-based reinforcing material in the second lateral surface part are substantially the same.

In the sixth form, instead of by using the method for blowing air against raw materials and sifting the raw materials, a building material is manufactured by causing powder raw materials to accumulate on the template while sifting the powder raw materials by using a sifting machine in which a meshed sieve sheet is repeatedly pulled and bent.

The sieve sheet contains an elastic material and is capable of stretching and contracting. In the sifting machine, for example, the sieve sheet vibrates vertically due to the sieve sheet being stretched and contracted so that the sieve sheet is repeatedly and alternately pulled and bent in a direction parallel to the template, and the vertical vibration of the sieve sheet causes powder raw materials to be thrown up and to fall repeatedly. Therefore, even if the powder raw materials come into close contact with each other and become a coarse lump, shock produced when the vertically vibrating sieve sheet causes the powder raw materials to be thrown up and fall loosens the raw-material lump and separates the powder raw materials into powder raw materials having the proper sizes, as a result of which the powder raw materials are formed so as to be passable through the sieve sheet.

The template includes a concave part for forming the convex part on the building material, and is disposed below the sifting machine with its surface including the concave part facing upward.

The convex part including the first lateral surface part and the second lateral surface part corresponding to the first lateral surface part is formed on a surface of the manufactured building material. In addition, since, in the convex part where holes are easily formed, the plant-based reinforcing material is distributed in the mixture with the hydraulic material and the admixture attached thereto, the attached hydraulic material and admixture suppress absorption of moisture of the plant-based reinforcing material and absorption of water of the plant-based reinforcing material to improve the durability of the present building material. In addition, since the plant-based reinforcing material with the hydraulic material and the admixture attached thereto is distributed in the mixture containing the hydraulic material and the admixture, holes are not easily formed between the plant-based reinforcing material and the mixture containing the hydraulic material and the admixture. Therefore, absorption of water of the present building material is suppressed to improve the durability of the present building material.

In addition, at the convex part, the distribution of the plant-based reinforcing material at the first lateral surface part and the distribution of the plant-based reinforcing material at the second lateral surface part are substantially the same. "The distributions are substantially the same" means that, in a predetermined range, the sizes and numbers of holes are the same or close to each other. As described above, holes are not easily formed between the plant-based reinforcing material with the hydraulic material and the admixture attached thereto and the mixture containing the hydraulic material and the admixture, and, at the convex part, since the distribution of the plant-based reinforcing material at the first lateral surface part and the distribution of the plant-based reinforcing material at the second lateral surface part are substantially the same, absorption of water from the first lateral surface part and absorption of water from the second lateral surface part are suppressed to improve the durability of the present building material.

A method for manufacturing a building material according to a seventh form of the present invention is based on the sixth form, and is such that the sifting machine includes a plurality of the meshes having a plurality of sizes and the template is movable at a location below the sifting machine. By moving the template and by causing the powder raw materials to fall from the meshes having the plurality of sizes of the sifting machine, the powder raw materials are caused to accumulate on the template.

"The sifting machine includes a plurality of the meshes having a plurality of sizes" can be realized by including, for example, a plurality of sieve sheets having differently sized meshes or a sieve sheet having differently sized meshes.

"The template is movable at a location below the sifting machine" can be realized by, for example, disposing a conveying device, such as a belt conveyor, below the sifting machine and disposing the template on the conveying device.

In the seventh form, since powder raw materials are caused to accumulate on the template by causing the powder raw materials to fall from the differently sized meshes of the sifting machine, it is possible to successively accumulate the powder raw materials having different sizes. It is possible to cause fine powder raw materials to accumulate on a surface side of the template and to improve the durability of the building material that is manufactured.

In a method for manufacturing a building material according to an eighth form of the present invention, the powder raw material is manufactured by adding and mixing water to and with the plant-based reinforcing material and then by adding and mixing the hydraulic material and the inorganic admixture. By mixing the plant-based reinforcing material mixed with water with the hydraulic material and the admixture, the hydraulic material and the admixture can be efficiently attached to the plant-based reinforcing material. Since the plant-based reinforcing material with the hydraulic material and the admixture attached thereto is such that absorption of water is suppressed and holes are not easily formed between the plant-based reinforcing material and the mixture containing the hydraulic material and the admixture, the durability of the building material that is manufactured is improved.

Advantageous Effects of Invention

According to the building material and the method for manufacturing the building material of present invention, it is possible to provide a building material having excellent durability.

DESCRIPTION OF EMBODIMENTS

Embodiments of the present invention are described below with reference to the drawings. In the embodiments of the present invention, a wall material is given as an example of a building material and is described.

(Method for Manufacturing Wall Material of First Embodiment)

Figure 1:
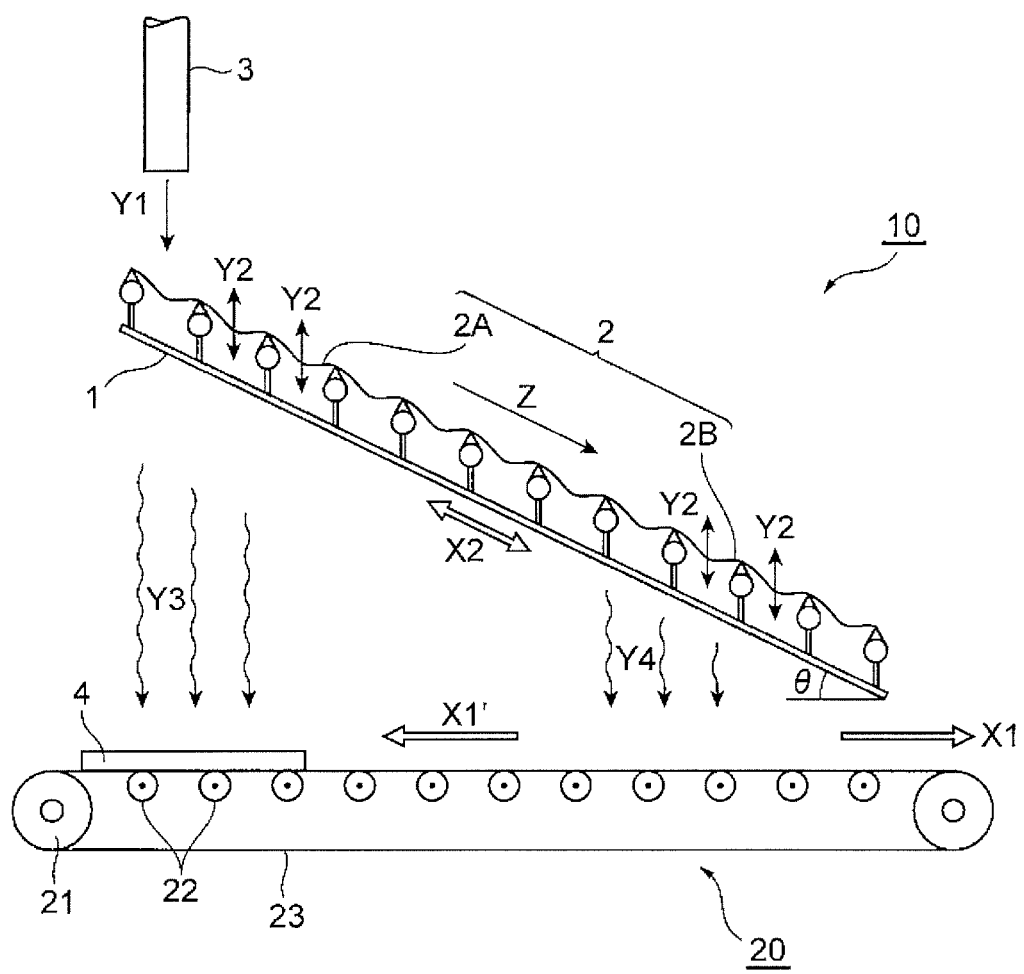
FIG. 1 is a schematic view illustrating a method for manufacturing a wall material of a first embodiment of the present invention.
Figure 2:
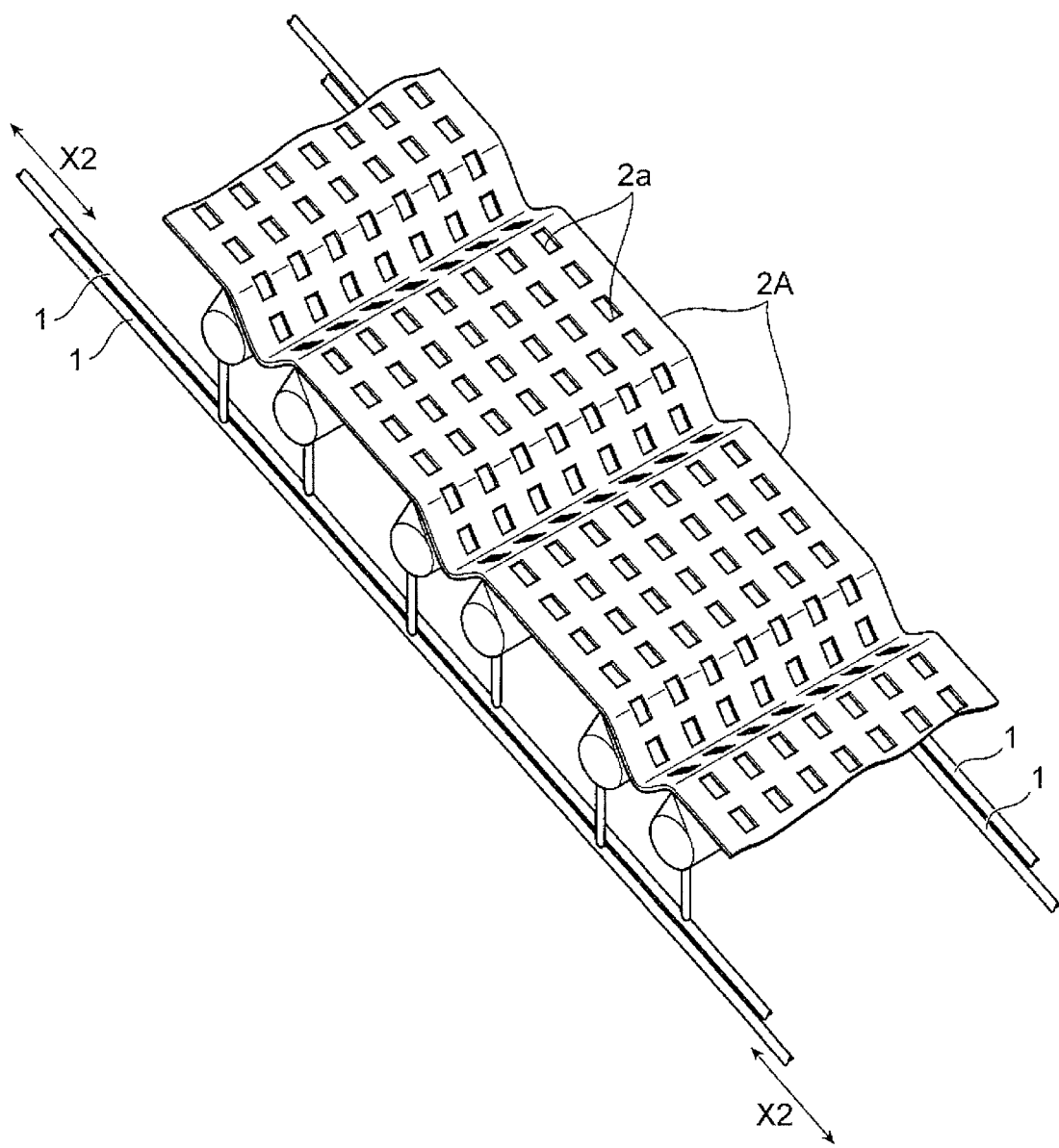
FIG. 2 is a view illustrating a sifting machine in detail.
Figure 3:
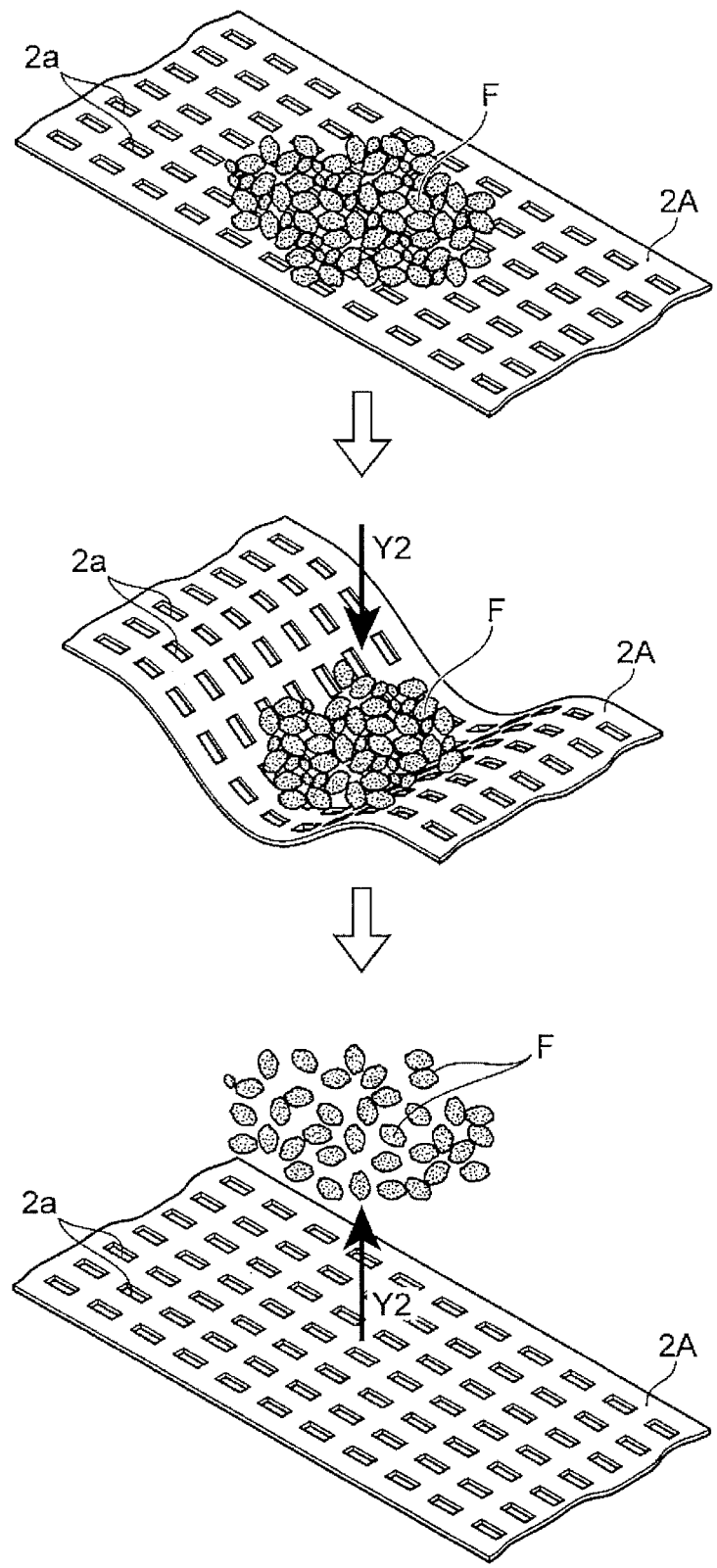
FIG. 3 is a schematic view illustrating vertical vibration of a sieve sheet and movements of powder raw materials.

FIG. 1 is a schematic view illustrating a method for manufacturing a wall material of a first embodiment of the present invention. FIG. 2 is a view illustrating a sifting machine in detail. FIG. 3 is a schematic view illustrating vertical vibration of a sieve sheet and movements of powder raw materials.

In the first embodiment, an illustrated sifting machine 10 and an illustrated conveying device 20 disposed below the sifting machine 10 are used.

The sifting machine 10 includes a sieve sheet unit 2 that includes a first sieve sheet 2A and a second sieve sheet 2B arranged side by side, and a raw-material supplying part 3 that supplies powder raw materials to the first sieve sheet 2A, the first sieve sheet 2A having relatively fine meshes and the second sieve sheet 2B having relatively coarse meshes. Each of the sieve sheets 2A and 2B is made of, for example, an elastic material, such as urethane, and is capable of expanding and contracting. Each of the sieve sheets 2A and 2B is capable of vibrating vertically (Y2 directions).

As shown in FIG. 2, in the sifting machine 10, two cross beams 1 and 1 that are arranged side by side each support at a predetermined interval the sieve sheet 2A (2B) having a plurality of meshes 2a. When the cross beams 1 and 1 slide in opposite directions (X2 directions) with respect to each other by using an actuator (not shown), at the same time that a portion of the sieve sheet 2A (2B) supported by each of the cross beams 1 and 1 is bent, the other portion of the sieve sheet 2A (2B) supported by each of the cross beams 1 and 1 is pulled. A form in which only one of the cross beams 1 and 1 is reciprocated by the actuator may be used.

With powder raw materials F being placed on the pulled sieve sheet 2A as shown in the top view of FIG. 3, the powder raw materials F are then moved downward due to the sieve sheet 2A being bent (Y2 direction) as shown in the middle view of FIG. 3. Next, as shown in the bottom view of FIG. 3, due to the sieve sheet 2A being pulled again and lifted (Y2 direction), the powder raw materials F that have been moved downward are thrown up.

In this way, due to the vertical vibration (wavy motion) of the sieve sheet 2A (2B), it is possible to reduce the powder raw materials F into powder to cause only the powder raw materials F having sizes that can pass through the meshes 2a to fall.

By sifting the powder raw materials F while the sieve sheet 2A (2B) vibrates vertically, the meshes 2a are not easily clogged and it is not necessary to blow air against the powder raw materials as it is in sifting methods of the related art. Therefore, it is possible to reduce the size of a facility and the facility need not be frequently cleaned.

Returning to FIG. 1, the conveying device 20 disposed below the sifting machine 10 includes a belt conveyor 23 that moves due to rotation of a main rotating roller 21 and an auxiliary rotating roller 22, and the movement of the belt conveyor 23 allows a template 4 installed thereon to travel continuously at a constant speed and in a constant direction (X1 direction). The template 4 is caused to travel by the conveying device 20 with its surface (not shown) having a concavo-convex portion facing upward.

The sieve sheet unit 2 is disposed so as to be inclined downward with respect to a travel direction (X1 direction) of the template 4 so that the first sieve sheet 2A is on a higher side of the inclination (inclination angle θ). Here, the inclination angle θ of the sieve sheet unit 2 is set at an angle that allows the powder raw materials F to roll down naturally along the inclination, and, though depending upon the powder raw materials used, may be set in a range of, for example, 12 degrees to 21 degrees.

Next, in the first embodiment, by mixing a hydraulic material, an admixture, a plant-based reinforcing material, and water with each other, powder raw materials are manufactured. When the water is contained by 30 parts by mass to 45 parts by mass with respect to 100 parts by mass of the total solid content of the powder raw materials, the hydraulic material and the admixture can be efficiently attached to the plant-based reinforcing material. This is desirable.

Examples of the hydraulic material include Portland cement, early strength cement, alumina cement, blast furnace cement, fly ash cement, silica fume cement, and other types of cement; anhydrous gypsum, hemihydrate gypsum, dihydrate gypsum, and other types of gypsum; and a blast furnace slag, a converter slag, and other types of slag.

Examples of the admixture include quartz sand, silica rock powder, silica powder, coal ash, paper sludge ash, perlite, silica fume, mica, calcium carbonate, magnesium hydroxide, aluminum hydroxide, vermiculite, sepiolite, xonotlite, diatomaceous earth, kaolinite, zeolite, wollastonite, and a recycled raw material in which a wood cement board is pulverized. Coal ash, mica, and wollastonite are desirable in that they are suitable for realizing a wall material having high strength and excellent dimensional stability. Perlite and resin bead are desirable in that they are suitable for realizing a light wall material.

Examples of the plant-based reinforcing material include a piece of wood, a piece of bamboo, wood powder, used paper, Nadelholz unbleached kraft pulp, Nadelholz bleached kraft pulp, Laubholz unbleached kraft pulp, and Laubholz bleached kraft pulp.

The powder raw materials may contain other materials in addition to the aforementioned materials. Examples of the other materials include a waterproofing agent and a hardening accelerator.

Next, the sifting machine 10 and the conveying device 20 are moved to form a wall-material mat on the template 4 that moves.

Specifically, first, powder raw materials are caused to fall from the raw-material supplying part 3 onto the first sieve sheet 2A (Y1 direction) that is vibrating vertically (Y2 directions).

The powder raw materials supplied to the first sieve sheet 2A that is vibrating vertically (Y2 directions) are reduced to powder due to the vertical vibration of the first sieve sheet 2A, and only powder raw materials having sizes that can pass through the meshes 2a pass through the meshes 2a of the first sieve sheet 2A, and fall due to their own weight (Y3 direction) and accumulate in the form of a layer on the template 4 that travels.

Since the powder raw materials in a loosened state caused by the vertical vibration of the first sieve sheet 2A fall due to their own weight towards the template from the sieve sheet, the plant-based reinforcing with the hydraulic material and the admixture attached thereto can accumulate on the template 4. Since the hydraulic material, the admixture, and the plant-based reinforcing material with the hydraulic material and the admixture attached thereto accumulate on the template by falling onto the template 4 due to their own weight, the hydraulic material, the admixture, and the plant-based reinforcing material with the hydraulic material and the admixture attached thereto accumulate in a concave part of the template in substantially the same ratio and in substantially the same amount.

Any powder raw material that could not pass through the first sieve sheet 2A and that remains thereon rolls down naturally along the inclination (angle θ) of the sieve sheet unit 2 towards the second sieve sheet 2B, passes through the meshes of the second sieve sheet 2B that is vibrating vertically (Y2 directions), and fall (Y4 direction) and accumulate in the form of a layer on the template 4 that is conveyed.

Specifically, a core layer 6 formed from the powder raw materials that have passed through the meshes of the second sieve sheet 2B and that have relatively large sizes is formed on a surface layer 5 that has already been formed on the template 4, as a result of which a wall-material mat 7 including the surface layer 5 and the core layer 6 is formed.

Since the powder raw materials in a loosened state caused by the vertical vibration of the second sieve sheet 2B fall due to their own weight towards the template from the sieve sheet, the plant-based reinforcing with the hydraulic material and the admixture attached thereto can accumulate on the template. Since the hydraulic material, the admixture, and the plant-based reinforcing material with the hydraulic material and the admixture attached thereto accumulate on the template by falling onto the template due to their own weight, the hydraulic material, the admixture, and the plant-based reinforcing material with the hydraulic material and the admixture attached thereto accumulate over the entire surface of the template in substantially the same ratio and in substantially the same amount.

Figure 4:
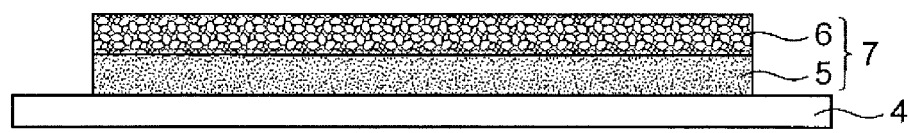
FIG. 4 is a sectional schematic view of a wall-material mat in the first embodiment.

FIG. 4 is a sectional schematic view of the wall-material mat formed in the first embodiment. As shown in FIG. 4, the surface layer 5 formed from the powder raw materials that have passed through the meshes 2a of the first sieve sheet 2A and that have relatively small sizes is formed on the template 4, and the core layer 6 formed from the powder raw materials that have passed through the meshes of the second sieve sheet 2B and that have relatively large sizes is formed on the surface layer 5. Although the template 4 and the surface layer 5 each have a concavo-convex portion on its surface, the concavo-convex portions are not shown in FIG. 4.

The surface layer 5 is a fine layer that is highly water resistant, and since the core layer 6 has low density and is light, the core layer 6 becomes a layer having cushioning properties. Therefore, the wall-material mat 7 in which the light core layer 6 having cushioning properties is formed on an inner side of the fine surface layer 5 that is highly water resistant is formed.

After forming the wall-material mat 7 as shown in FIG. 4, the formed wall-material mat 7 and the template 4 are pressed to manufacture a wall material by curing.

In this way, by forming the wall-material mat 7 on the template 4 by using the sifting machine 10 and the conveying device 20 that conveys the template 4 at a location below the sifting machine 10, it is possible to efficiently form the wall-material mat 7 and thus to efficiently manufacture the wall material.

(Wall Material Manufactured by First Embodiment)

Figure 5:
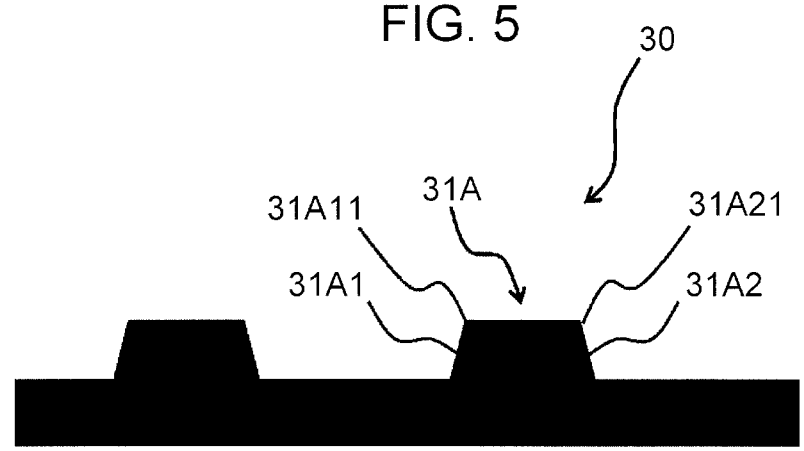
FIG. 5 is a sectional schematic view of a wall material manufactured by the method for manufacturing a wall material of the first embodiment of the present invention.

FIG. 5 shows a cross section of the vicinity of a surface of a wall material 30 manufactured by the first embodiment. A plurality of convex parts 31A are formed on a surface of the wall material 30 by the concavo-convex portion of the template 4. Each convex part 31A includes a first lateral surface part 31A1, a second lateral surface part 31A2 corresponding to the first lateral surface part 31A1, and a top surface part that connects the first lateral surface part 31A1 and the second lateral surface part 31A2 to each other. An edge part of the first lateral surface part 31A1 is a first edge part 31A11, and an edge part of the second lateral surface part 31A2 is a second edge part 31A21. The first edge part 31A11 and the second edge part 31A21 oppose each other with the top surface part interposed therebetween.

Since the wall material 30 is manufactured by causing the powder raw materials in a loosened state to fall due to their own weight towards the template from the sieve sheets, at the wall material 30, the plant-based reinforcing material with the hydraulic material and the admixture attached thereto is distributed uniformly in a mixture containing the hydraulic material and the admixture. Since the powder raw materials in the loosened state also fall due to their own weight into concave parts of the template that form the convex parts 31A of the wall material 30, at the convex parts 31A of the wall material 30, the plant-based reinforcing material with the hydraulic material and the admixture attached thereto is uniformly distributed in the mixture of the hydraulic material and the admixture.

Since the hydraulic material, the admixture, and the plant-based reinforcing material with the hydraulic material and the admixture attached thereto accumulate over the entire surface of the template in substantially the same ratio and in substantially the same amount, the wall material 30 is manufactured. Since the hydraulic material, the admixture, and the plant-based reinforcing material with the hydraulic material and the admixture attached thereto also accumulate in substantially the same ratio and in substantially the same amount in the concave parts of the template that form the convex parts 31A of the wall material 30, the distribution of the plant-based reinforcing material at the first lateral surface part 31A1 of each convex part 31A and the distribution of the plant-based reinforcing material at the second lateral surface part 31A2 of each convex part 31A are substantially the same. Since the plant-based reinforcing material with the hydraulic material and the admixture attached thereto is such that the hydraulic material and the admixture suppress absorption of moisture of the plant-based reinforcing material and gaps are not easily formed between the plant-based reinforcing material and the mixture containing the hydraulic material and the admixture, absorption of water of each first lateral surface part 31A1 and absorption of water of each second lateral surface part 31A2 are suppressed, as a result of which the wall material 30 has excellent durability.

Further, since the distribution of holes formed in the first edge part 31A11 of each convex part 31A and the distribution of holes formed in the second edge part 31A21 of each convex part 31A are substantially the same, absorption of water of each first edge part 31A11 and absorption of water of each second edge part 31A21 are suppressed, as a result of which the wall material 30 has excellent durability.

Further, the water absorbency of the first edge part 31A11 of each convex part 31A and the water absorbency of the second edge part 31A21 of each convex part 31A are substantially the same. Since the plant-based reinforcing material that is distributed at each first edge part 31A11 and each second edge part 31A21 is such that absorption of moisture of the plant-based reinforcing material is suppressed due to the attachment of the hydraulic material and the admixture thereto, absorption of water of each first edge part 31A11 and absorption of water of each second edge part 31A21 are suppressed, as a result of which the wall material 30 has excellent durability.

Further, since absorption of water of each first edge part 31A11 and absorption of water of each second edge part 31A21 are substantially equally suppressed, the freeze-thaw durability of the first edge part 31A11 of each convex part 31A and the freeze-thaw durability of the second edge part 31A21 of each convex part 31A are substantially the same. Therefore, the wall material 30 has excellent durability.

(Method for Manufacturing Wall Material of Second Embodiment)

In a second embodiment, in FIG. 1, after the template 4 has reached an edge part of the second sieve sheet 2B and a layered structure of the surface layer 5 and the core layer 6, which is shown in FIG. 4, has been formed, next, the conveying device 20 is caused to convey in an opposite direction and the template 4 is moved in the opposite direction (X1' direction) to further form a wall-material mat having a multilayer structure.

Figure 6:
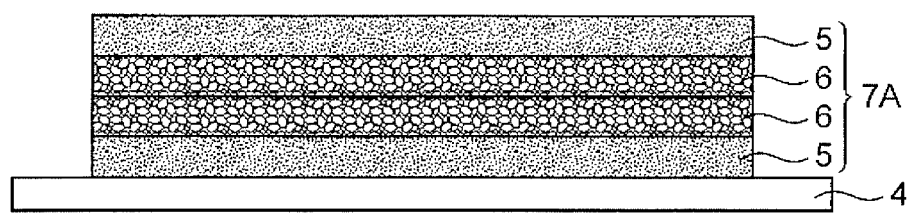
FIG. 6 is a sectional schematic view of a wall-material mat in a second embodiment of the present invention.

Specifically, by causing the template 4 to pass directly below the second sieve sheet 2B again, a separate core layer 6 is separately formed on the core layer 6 as shown in FIG. 6. Although the template 4 and the surface layer 5 that is in contact with the template 4 each have a concavo-convex portion on its surface, the concavo-convex portions are not shown in FIG. 6.

Further, by causing the template 4 to pass directly below the first sieve sheet 2A, as shown in FIG. 6, a separate surface layer 5 is formed on the separate core layer 6, and a wall-material mat 7A in which two core layers 6 are formed between the surface layers 5, which are front and rear layers, is formed.

Next, the wall-material mat 7A and the template 4 are pressed to manufacture a wall material by curing.

(Wall Material Manufactured by Second Embodiment)

Similarly to the wall material 30 manufactured by the first embodiment, a plurality of convex parts are formed on a surface of the wall material manufactured by the second embodiment by the concavo-convex portion of the template 4. Each convex part includes a first lateral surface part, a second lateral surface part, a top surface part, a first edge part, and a second edge part.

Even the wall material manufactured by the second embodiment is manufactured by causing powder raw materials in a loosened state to fall due to their own weight towards the template 4 from the sieve sheets. Therefore, at each convex part, a plant-based reinforcing material with a hydraulic material and an admixture attached thereto is distributed uniformly in a mixture of the hydraulic material and the admixture, and at the first lateral surface part of each convex part and at the second lateral surface part of each convex part, the plant-based reinforcing material has substantially the same distribution, as a result of which the durability is excellent.

Even the wall material manufactured by the second embodiment is manufactured by causing the hydraulic material, the admixture, and the plant-based reinforcing material with the hydraulic material and the admixture attached thereto to accumulate over the entire surface of the template in substantially the same ratio and in substantially the same amount. Therefore, the distribution of holes, the water absorbencies, and the freeze-thaw durabilities of the first edge parts of the convex parts and the distribution of holes, the water absorbencies, and the freeze-thaw durabilities of the second edge parts of the convex parts are substantially the same, as a result of which the wall material manufactured by the second embodiment has excellent durability.

Further, since both surfaces of the wall material manufactured by the second embodiment are fine surfaces that are highly water resistant, the wall material manufactured by the second embodiment excels in durability compared to the wall material manufactured by the first embodiment.

(Method for Manufacturing Wall Material of Third Embodiment)

Figure 7:
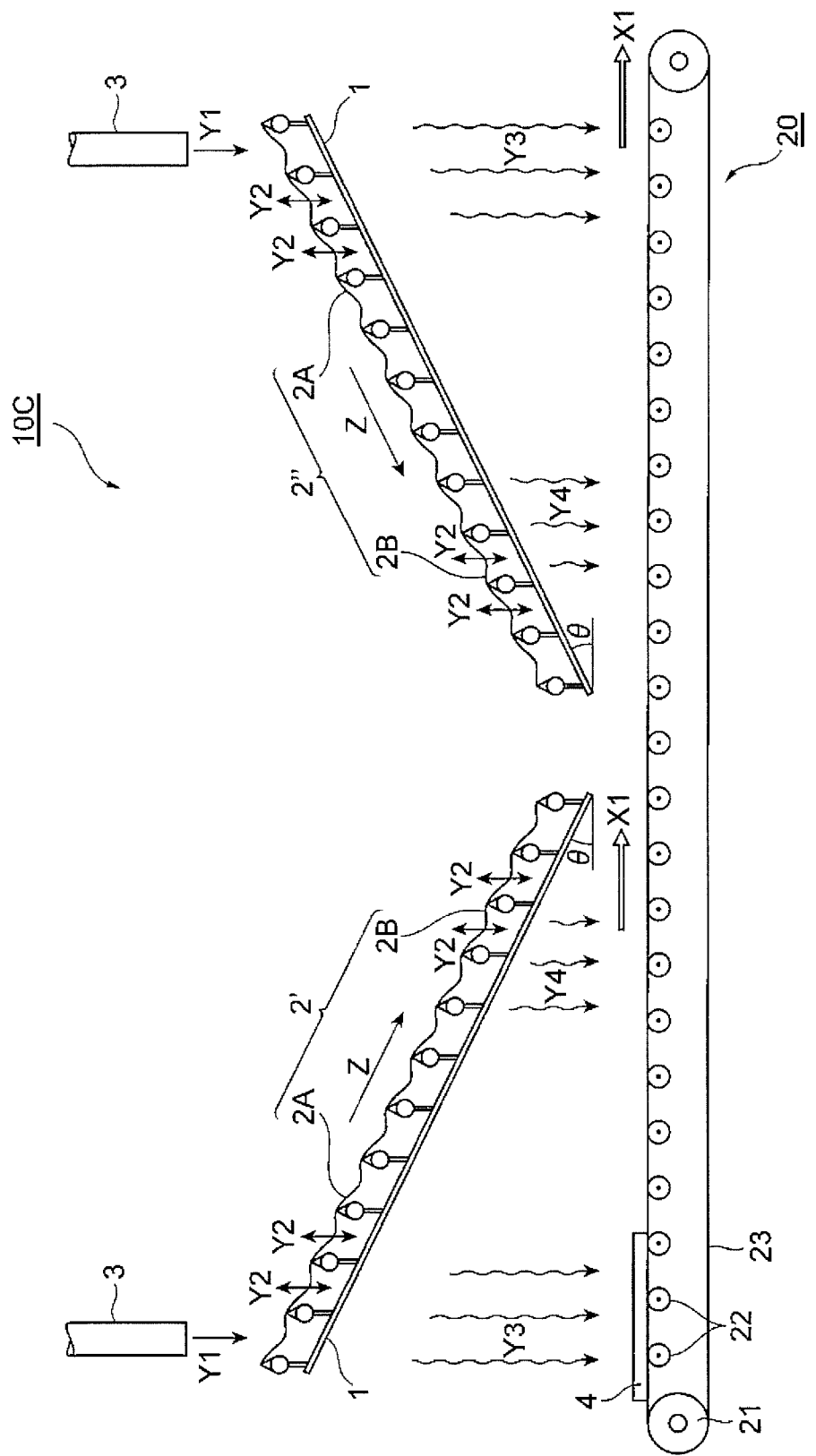
FIG. 7 is a schematic view illustrating a method for manufacturing a wall material of a third embodiment of the present invention.

FIG. 7 is a schematic view illustrating a method for manufacturing a wall material of a third embodiment.

In the method for manufacturing a wall material according to the third embodiment, a wall-material mat is manufactured by using a sifting machine 10C including a first sieve sheet unit 2' and a second sieve sheet unit 2". The first sieve sheet unit 2' includes a first sieve sheet 2A and a second sieve sheet 2B. The second sieve sheet unit 2" includes a third sieve sheet 2A and a fourth sieve sheet 2B.

More specifically, the first sieve sheet unit 2' is disposed on an upstream side in the travel direction (X1 direction) of a template 4, and the second sieve sheet unit 2" is disposed on a downstream side.

The first sieve sheet unit 2' is disposed so as to be inclined downward with respect to the travel direction (X1 direction) of the template 4 so that the first sieve sheet 2A is on a higher side of the inclination. The second sieve sheet unit 2" is disposed so as to be inclined upward with respect to the travel direction (X1 direction) of the template 4 so that the third sieve sheet 2A is on a higher side of the inclination. In the third embodiment, the sieve sheet units 2' and 2" are disposed so as to form a V shape.

Next, water is added to and mixed with a plant-based reinforcing material. By mixing the acquired plant-based reinforcing material, a hydraulic material, and an admixture with each other, powder raw materials are manufactured. As the hydraulic material, the admixture, and the plant-based reinforcing material, those indicated in the first embodiment can be used.

It is desirable to add water so as to be 30 to 45 parts by mass with respect to 100 parts by mass of the total solid content of the powder raw materials because the hydraulic material and the admixture can be efficiently attached to the plant-based reinforcing material. In the third embodiment, water may be further added and mixed when mixing the plant-based reinforcing material with which the water has been mixed, the hydraulic material, and the admixture. In this case, the acquired powder raw materials are manufactured so that the water is contained by 30 parts by mass to 45 parts by mass with respect to 100 parts by mass of the total solid content of the powder raw materials.

Next, by supplying the powder raw materials to the first sieve sheet 2A of the first sieve sheet unit 2' and causing powder raw materials that pass through meshes of the first sieve sheet 2A to fall onto the template 4 (Y3 direction) that conveys, a surface layer 5 is formed on the template 4 as shown in FIG. 4. Then, by moving any powder raw material remaining on the first sieve sheet 2A along the inclination to the second sieve sheet 2B (Z direction) and causing powder raw materials that pass through meshes of the second sieve sheet 2B to fall onto the surface layer 5 (Y4 direction) that has already been formed, a core layer 6 is formed as shown in FIG. 4.

The template 4 is moved to the second sieve sheet unit 2" by the conveying device 20. At the second sieve sheet unit 2", powder raw materials are supplied to the third sieve sheet 2A, powder raw materials that pass through meshes of the third sieve sheet 2A are caused to fall (Y3 direction), any powder raw material remaining on the third sieve sheet 2A without passing therethrough is caused to roll down along the inclination to the fourth sieve sheet 2B, and powder raw materials that pass through meshes of the fourth sieve sheet 2B are caused to fall (Y4 direction).

On the template 4 that has moved to the second sieve sheet unit 2", first, the powder raw materials that have passed through the meshes of the fourth sieve sheet 2B fall, and a separate core layer 6 is formed on the core layer 6 that has already been formed as shown in FIG. 6.

In a process in which the template 4 further moves and passes directly below the third sieve sheet 2A, the powder raw materials that have passed through the meshes of the third sieve sheet 2A fall, and a separate surface layer 5 is formed on the separate core layer 6 that has already been formed as shown in FIG. 6.

According to the third embodiment, it is possible to more efficiently form a wall-material mat 7A including two core layers 6 that are stacked upon each other on inner sides of the two respective surface layers 5, which are front and rear layers.

Next, as in the second embodiment, combinations (sets) of the wall-material mat 7A and the template 4 are stacked upon each other and pressed to manufacture a wall material by curing.

(Wall Material Manufactured by Third Embodiment)

Similarly to the wall material 30 manufactured by the first embodiment, a plurality of convex parts are formed on a surface of the wall material manufactured by the third embodiment by a concavo-convex portion of the template 4. Each convex part includes a first lateral surface part, a second lateral surface part, a top surface part, a first edge part, and a second edge part.

The wall material manufactured by the third embodiment is also manufactured by causing the powder raw materials in a loosened state to fall due to their own weight towards the template from the sieve sheets. Therefore, at the convex parts, the plant-based reinforcing material with the hydraulic material and the admixture attached thereto is distributed uniformly in a mixture containing the hydraulic material and the admixture, and the distribution of the plant-based reinforcing material of the first lateral surface part of each convex part and the distribution of the plant-based reinforcing material of the second lateral surface part of each convex part are substantially the same, as a result of which the durability is excellent.

The wall material manufactured by the third embodiment is also manufactured by causing the hydraulic material, the admixture, and the plant-based reinforcing material with the hydraulic material and the admixture attached thereto to accumulate over the entire surface of the template in substantially the same ratio and in substantially the same amount. Therefore, the distribution of holes, the water absorbencies, and the freeze-thaw durabilities are substantially the same at the first edge part of each convex part as at the second edge part of each convex part, as a result of which the wall material manufactured by the third embodiment has excellent durability.

Since both surfaces of the wall material manufactured by the third embodiment are fine surfaces that are highly water resistant, the wall material manufactured by the third embodiment excels in durability compared to the wall material manufactured by the first embodiment.

(Method for Manufacturing Wall Material of Fourth Embodiment)

Figure 8:
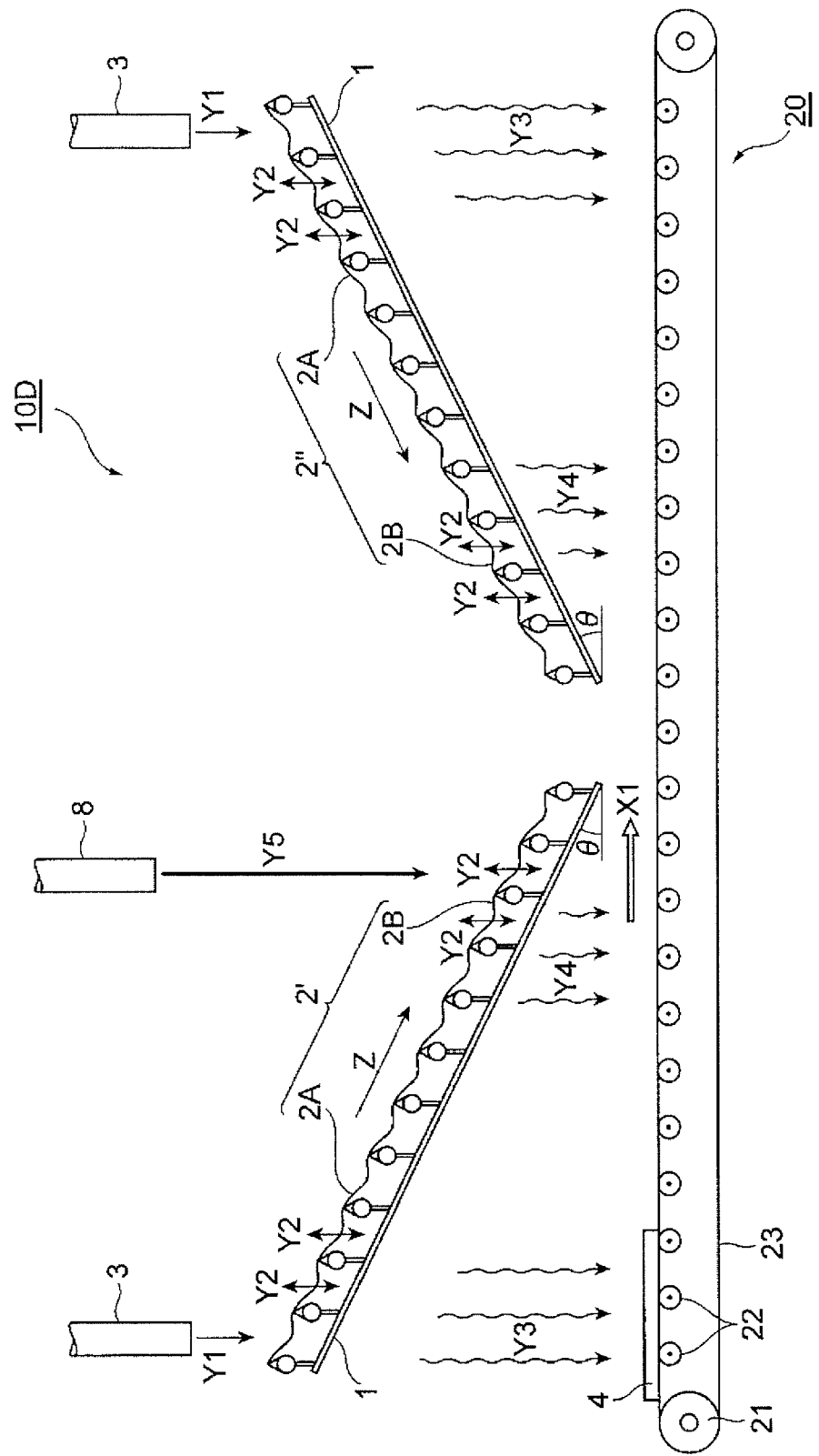
FIG. 8 is a schematic view illustrating a method for manufacturing a wall material of a fourth embodiment of the present invention.

FIG. 8 is a schematic view illustrating a method for manufacturing a wall material of a fourth embodiment.

In the method for manufacturing a wall material of the fourth embodiment, a wall-material mat is manufactured by using a sifting machine 10D in which a central raw-material supplying part 8 is disposed above the first sieve sheet unit 2' of the sifting machine 10C used in the method for manufacturing a wall material of the third embodiment. More specifically, in the sifting machine 10D, the central raw-material supplying part 8 is disposed above the second sieve sheet 2B of the first sieve sheet unit 2'.

Powder raw materials used in the fourth embodiment and the manufacturing method therefor are the same as those of the third embodiment.

Figure 9:
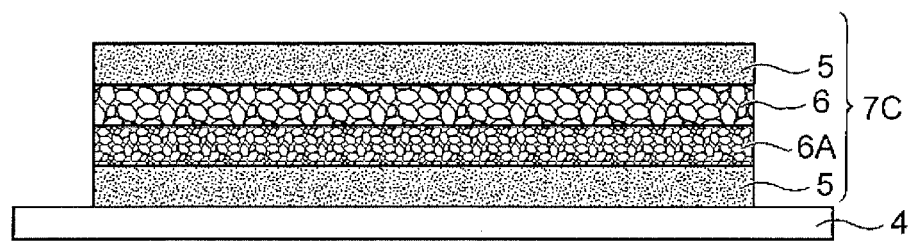
FIG. 9 is a sectional schematic view of a wall-material mat in the fourth embodiment.

In the fourth embodiment, when the template 4 passes below the sieve sheet 2A of the first sifting unit 2', as shown in FIG. 9, a surface layer 5 is formed on the template 4. Then, when the template 4 passes below the sieve sheet 2A of the first sieve sheet unit 2', of powder raw materials remaining on the first sieve sheet 2A that have been moved along an inclination to the second sieve sheet 2B and of powder raw materials that have been supplied from the central raw-material supplying part 8, powder raw materials that have passed through the second sieve sheet 2B form a core layer 6A. Although the template 4 and the surface layer 5 that is in contact with the template 4 each have a concavo-convex portion on its surface, the concavo-convex portions are not shown in FIG. 9.

In a process in which the template 4 reaches and passes the second sieve sheet unit 2", a separate core layer 6 and a separate surface layer 5 are formed and a wall-material mat 7C including two core layers 6A and 6 that are stacked upon each other on inner sides of the two respective surface layers 5, which are front and rear layers, is formed.

Since the core layer 6A contains the powder raw materials supplied from the central raw-material supplying part 8 (Y5 direction), powder raw materials having sizes that are relatively smaller than those of the core layer 6 are mixed.

As in the first to third embodiments, combinations (sets) of the wall-material mat 7C and the template 4 are stacked upon each other and pressed to manufacture a wall material by curing.

(Wall Material Manufactured by Fourth Embodiment)

Similarly to the wall material 30 manufactured by the first embodiment, a plurality of convex parts are formed on a surface of the wall material manufactured by the fourth embodiment by the concavo-convex portion of the template 4. Each convex part includes a first lateral surface part, a second lateral surface part, a top surface part, a first edge part, and a second edge part.

The wall material manufactured by the fourth embodiment is also manufactured by causing the powder raw materials in a loosened state to fall due to their own weight towards the template 4 from the sieve sheets. Therefore, at the convex parts, a plant-based reinforcing material with a hydraulic material and an admixture attached thereto is distributed uniformly in a mixture of the hydraulic material and the admixture, and the distribution of the plant-based reinforcing material of the first lateral surface part of each convex part and the distribution of the plant-based reinforcing material of the second lateral surface part of each convex part are substantially the same, as a result of which the durability is excellent.

The wall material manufactured by the fourth embodiment is also manufactured by causing the hydraulic material, the admixture, and the plant-based reinforcing material with the hydraulic material and the admixture attached thereto to accumulate over the entire surface of the template in substantially the same ratio and in substantially the same amount. Therefore, the distribution of holes, the water absorbencies, and the freeze-thaw durabilities are substantially the same at the first edge part of each convex part as at the second edge part of each convex part, as a result of which the wall material manufactured by the fourth embodiment has excellent durability.

Since both surfaces of the wall material manufactured by the fourth embodiment are fine surfaces that are highly water resistant, the wall material manufactured by the fourth embodiment excels in durability compared to the wall material manufactured by the first embodiment.

(Confirmation of Effects and Results Thereof)

Figure 13:
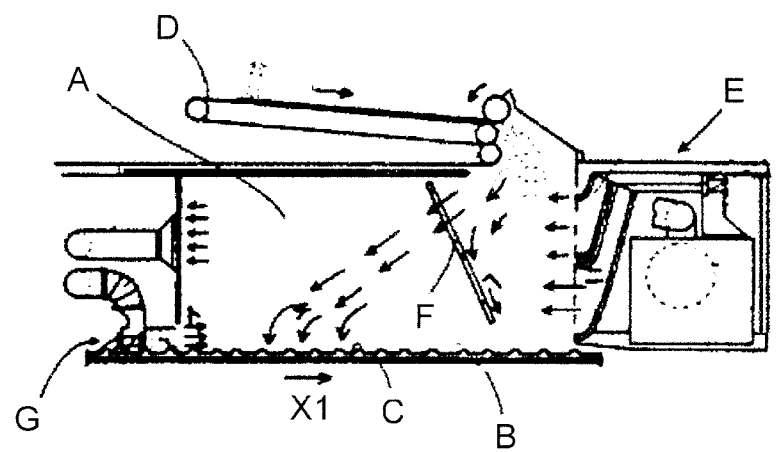
FIG. 13 is a schematic view illustrating a different building-material manufacturing device of the related art.

The present inventor et al. confirmed the effects. In an example, three wall materials were manufactured under the same conditions by using the method for manufacturing a wall material of the fourth embodiment (samples 1 to 3). On the other hand, in a comparative example, three wall materials were manufactured under the same conditions by using a device shown in FIG. 13 that blows away and sifts powder raw materials by using air (samples 4 to 6).

In both the example and the comparative example, powder raw materials were manufactured by adding and mixing Portland cement, coal ash, a recycled raw material in a which a wood cement board was pulverized, and calcium formate to and with a piece of wood acquired by adding and mixing water. The total solid content of the powder raw materials was such that the content of Portland cement was 30 mass %, the content of coal ash was 30 mass %, the content of the piece of wood was 15 mass %, and the content of the recycled raw material in which the wood cement board was pulverized was 25 mass %. Water and calcium formate were added so that the water content became 30 mass % and the content of calcium formate became 5 mass % with respect to the total solid content of the powder raw materials.

By using a fine-stone-masonry patterned template including convex parts having a pattern depth of 5 mm, having a slope rising angle of 60 degrees, and having a top-surface-part width of 108 mm, wood cement boards having a thickness of 16 mm were manufactured. With the press pressure of wall-material mats and the template being 4.5 MPa, autoclave curing was performed for six hours at 165° C. and 0.6 MPa.

Figure 10:
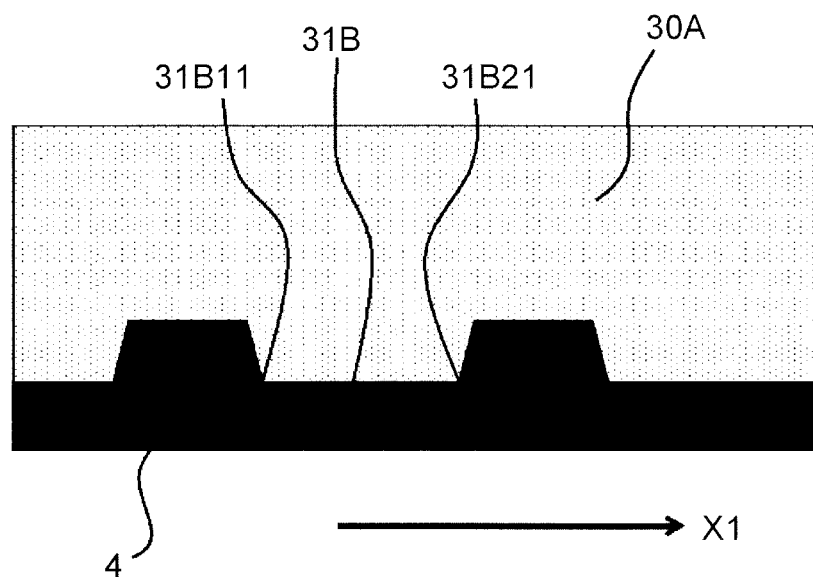
FIG. 10 is a sectional schematic view of a wall material before removal from a template.
Figure 11:
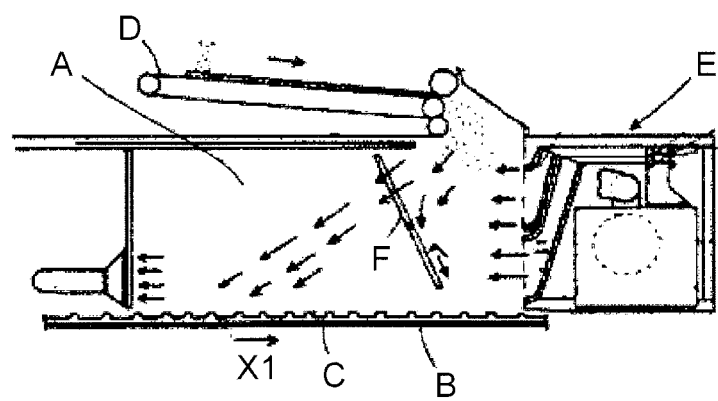
FIG. 11 is a schematic view illustrating a building-material manufacturing device of a related art.
Figure 12:
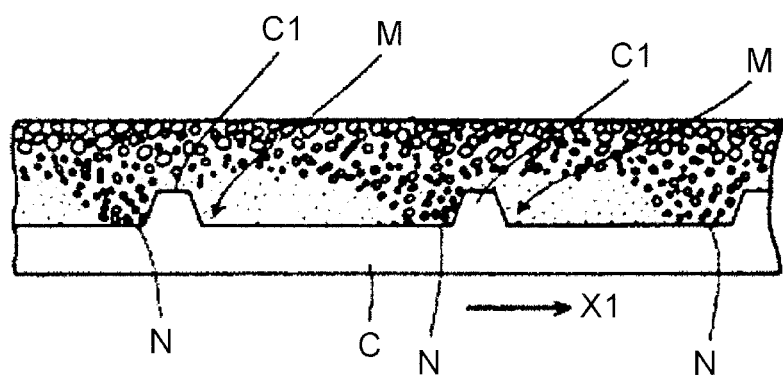
FIG. 12 is a sectional schematic view of a mat manufactured by the device of FIG. 11.

FIG. 10 shows the relationship between a wall material, which is a sample, and the template 4. FIG. 10 is a sectional schematic view of a wall material before removal from the template. In FIG. 10, convex parts 31B of a wall material 30A are formed by concave parts of the template. Each convex part 31B includes a first edge part 31B11 that is an edge part of a first lateral surface part and a second edge part 31B21 that is an edge part of a second lateral surface part and that corresponds to the first edge part 31B11. The conveying direction of the template 4 is X1, and each first edge part 31B11 is an edge part of the lateral surface part formed by an inclined surface of a template concave part inclined in the conveying direction X1 of the template. On the other hand, each second edge part 31B21 is an edge part of the lateral surface part formed by an inclined surface of the template concave part inclined in a direction opposite to the conveying direction X1 of the template.

Regarding the acquired wood cement boards, the sizes and numbers of holes were measured, and a water absorption test using a cylinder method and a freeze-thaw durability test were performed.

In measuring the sizes and the numbers of holes, a microscope "WHX-5000" manufactured by Keyence Corporation was used to observe the sizes and the numbers of holes formed in each first edge part 31B11 and each second edge part 31B21 at a field magnification of 50×. The observation range was a range having a width of 108 mm. The holes were classified into three types by size; and when the number of holes having a corresponding size was 0 to 2, the number of holes was evaluated as "◯" (few), when the number of holes having a corresponding size was 3 to 6, the number of holes was evaluated as "Δ" (somewhat few), when the number of holes having a corresponding size was 7 to 9, the number of holes was evaluated as "▲" (somewhat many), and when the number of holes having a corresponding size was 10 or more, the number of holes was evaluated as "×" (many).

In the water absorption test using the cylinder method, the acquired wood cement boards were coated with 90 g/m² of silicone-acrylic-emulsion-based coating and then the cylinder-method test prescribed in JIS A 5422 was performed on each first edge part 31B11 and each second edge part 31B21 to measure the height of reduced water.

In the freeze-thaw durability test, the acquired wood cement boards were each coated with 90 g/m² of silicone-acrylic-emulsion-based coating and then an air-freezing water-dissolution method prescribed in JIS A 1435 was performed for 720 cycles. Then, the microscope "WHX-5000" manufactured by Keyence Corporation was used to observe each first edge part 31B11 and each second edge part 31B21 at a field magnification of 50× and confirm whether or not there were any cracks in the coatings. The observation range was a range having a width of 108 mm. When there were cracks in the coating, the number of cracks was measured with, when the number of cracks in the coating was 0, the number of cracks being evaluated as "○" (none), when the number of cracks was 1 to 4, the number of cracks being evaluated as "Δ" (few), and when the number of cracks was 5 to 10, the number of cracks being evaluated as "x" (many). The results of measurements in each test are shown in Table 1 below.

as the mixture of the example, at each first edge part, the numbers of holes having a size of 1.0 mm or larger were all ○ (few), the numbers of holes having a size of 0.5 to 1.0 mm were all Δ (somewhat few), the numbers of holes having a size of 0 to 0.5 mm were such that there were one ▲ (somewhat many) and two x (many). On the other hand, at each second edge part of the samples 4 to 6 of the comparative example, the numbers of holes having a size of 1.0 mm or larger were all Δ (somewhat few), the numbers of

TABLE 1

| | Edge Part at Convex Part | Sample No. | Measurement of Size and Number of Holes | | | Water Absorption Test Using Cylinder Method (ml) | Freeze-Thaw Durability Test (720 Cycles) |
|---|---|---|---|---|---|---|---|
| | | | 0~0.5 mm | 0.5~1.0 mm | 1.0 mm~ | | |
| Example | First Edge Part | 1 | ▲ | ▲ | ○ | 0 | ○ |
| | | 2 | x | Δ | ○ | 1 | Δ |
| | | 3 | x | ○ | ○ | 1 | ○ |
| | Second Edge Part | 1 | x | Δ | ○ | 2 | ○ |
| | | 2 | ▲ | ▲ | ○ | 0 | ○ |
| | | 3 | ▲ | Δ | ○ | 1 | ○ |
| Comparative Example | First Edge Part | 4 | ▲ | Δ | ○ | 0 | ○ |
| | | 5 | x | Δ | ○ | 0 | Δ |
| | | 6 | x | Δ | ○ | 1 | Δ |
| | Second Edge Part | 4 | x | Δ | Δ | 2 | Δ |
| | | 5 | x | Δ | Δ | 5 | x |
| | | 6 | x | ▲ | Δ | 3 | Δ |

In the samples 1 to 3 of the example that were formed from a mixture containing a hydraulic material, an admixture, and a plant-based reinforcing material, at each first edge part, the numbers of holes having a size of 1.0 mm or larger were all ○ (few), the numbers of holes having a size of 0.5 mm to 1.0 mm were such that there were one ○ (few), one Δ (somewhat few), and one ▲ (somewhat many), and the numbers of holes having a size of 0 to 0.5 mm were such that there were one ▲ (somewhat many) and two x (many). On the other hand, at each second edge part of the samples 1 to 3 of the example, the numbers of holes having a size of 1.0 mm or larger were all ○ (few), the numbers of holes having a size of 0.5 to 1.0 mm were such that there were two Δ (somewhat few) and one ▲ (somewhat many), and the numbers of holes having a size of 0 to 0.5 mm were such that there were two ▲ (somewhat many) and one x (many). The results show that, in the example, the distribution of holes of each first edge part and the distribution of holes of each second edge part are substantially the same.

In the samples 1 to 3 of the example, at each first edge part, the heights of reduced water in the water absorption test using the cylinder method were 0 to 1 mm. On the other hand, at each second edge part of the samples 1 to 3 of the example, the heights of reduced water in the water absorption test using the cylinder method were 0 to 2 mm. The results show that, in the example, the water absorbency of each first edge part and the water absorbency of each second edge part are substantially the same.

Further, in the samples 1 to 3 of the example, at each first edge part, the freeze-thaw durability test was such that there were two ○ (none) and one Δ (few). On the other hand, at each second edge part of the samples 1 to 3 of the example, the freeze-thaw durability test was such that the numbers of cracks were all ○ (none). The results show that, in the example, the freeze-thaw durability of each first edge part and the freeze-thaw durability of each second edge part are substantially the same.

In contrast, in the samples 4 to 6 of the comparative example that were formed from a mixture that was the same as the mixture of the example, at each first edge part, the numbers of holes having a size of 1.0 mm or larger were all ○ (few), the numbers of holes having a size of 0.5 to 1.0 mm were all Δ (somewhat few), the numbers of holes having a size of 0 to 0.5 mm were such that there were one ▲ (somewhat many) and two x (many). On the other hand, at each second edge part of the samples 4 to 6 of the comparative example, the numbers of holes having a size of 1.0 mm or larger were all Δ (somewhat few), the numbers of holes having a size of 0.5 to 1.0 mm were such that there were two Δ (somewhat few) and one ▲ (somewhat many), and the numbers of holes having a size of 0 to 0.5 mm were all x (many). The results show that, in the comparative example, the distribution of holes of each first edge part and the distribution of holes of each second edge part differ from each other.

In the samples 4 to 6 of the comparative example, at each first edge part, the heights of reduced water in the water absorption test using the cylinder method were 0 to 1 mm. On the other hand, at each second edge part of the samples 4 to 6 of the comparative example, the heights of reduced water in the water absorption test using the cylinder method were 2 to 5 mm. The results show that, in the comparative example, the water absorbency of each first edge part and the water absorbency of each second edge part differ from each other.

Further, in the samples 4 to 6 of the comparative example, at each first edge part, the freeze-thaw durability test was such that there were one ○ (none) and two Δ (few). On the other hand, at each second edge part of the samples 4 to 6 of the comparative example, the freeze-thaw durability test was such that there were two Δ (few) and one x (many). The results show that, in the comparative example, the freeze-thaw durability of each first edge part and the freeze-thaw durability of each second edge part differ from each other.

Comparing the example and the comparative example with each other, at each second edge part of the samples 1 to 3 of the example, the numbers of holes having a size of 1.0 mm or larger were all ○ (few), the numbers of holes having a size of 0.5 to 1.0 mm were such that there were two Δ (somewhat few) and one ▲ (somewhat many), and the numbers of holes having a size of 0 to 0.5 mm were such that there were two ▲ (somewhat many) and one x (many). On the other hand, at each second edge part of the samples 4 to 6 of the comparative example, the numbers of holes having a size of 1.0 mm or larger were all Δ (somewhat few), the numbers of holes having a size of 0.5 to 1.0 mm were such that there were two Δ (somewhat few) and one ▲ (somewhat many), and the numbers of holes having a size of 0 to 0.5 mm were all x (many). The results show that the distribution of the holes of each second edge part of the example and the distribution of the holes of each second edge part of the comparative example differ from each other and that the number of holes of each second edge part of the example is less than the number of holes of each second edge part of the comparative example.

At each second edge of the samples 1 to 3 of the example, the heights of reduced water in the water absorption test using the cylinder method were 0 to 2 mm. On the other hand, at each second edge of the samples 4 to 6 of the comparative example, the heights of reduced water in the water absorption test using the cylinder method were 2 to 5 mm. The results show that the water absorbency of each second edge part of the example and the water absorbency of each second edge part of the comparative example differ from each other and that each second edge part of the example less easily absorbs water than each second edge part of the comparative example.

Further, at each second edge part of the samples 1 to 3 of the example, the freeze-thaw durability test was such that the numbers of cracks were all ○ (none). On the other hand, at each second edge part of the samples 4 to 6 of the comparative example, the freeze-thaw durability test was such that there were two Δ (few) and one x (many). The results show that the freeze-thaw durability of each second edge part of the example and the freeze-thaw durability of each second edge part of the comparative example differ from each other and that the freeze-thaw durability of each second edge part of the example is better than the freeze-thaw durability of each second edge part of the comparative example.

The foregoing test results show that the wood cement boards of the example are such that the distribution of holes, the water absorbencies, and the freeze-thaw durabilities of the first edge parts and the distribution of holes, the water absorbencies, and the freeze-thaw durabilities of the second edge parts are substantially the same, and show that the wood cement boards of the example have excellent durability.

Although embodiments of the present invention have been described in detail by using the drawings, specific configurations are not limited to the embodiments. For example, changes in design within a scope that does not depart from the spirit of the present invention are also included in the present invention.

REFERENCE SIGNS LIST 1 cross beam
2 sieve sheet unit
2' first sieve sheet unit
2'' second sieve sheet unit
2A first sieve sheet
2B second sieve sheet
2a mesh
3 raw-material supplying part
4 template
5 surface layer
6, 6A core layer
7, 7A, 7C wall-material mat
8 central raw-material supplying part
10, 10C, 10D sifting machine
20 conveying device
21 main rotating roller
22 auxiliary rotating roller
30 wall material
F powder raw material

The invention claimed is:

1. A method for manufacturing a multi-layered building material, comprising:
   moving a template for forming the multi-layered building material in a predetermined direction from an upper stream portion to an downstream portion under a first sifting machine having a first sieve sheet and a second sieve sheet, the second sieve sheet having a coarser mesh than the first sieve sheet, and the first sifting machine arranged to be inclined along the predetermined direction, in which the template is moved, so that an upper stream portion is higher than a downstream portion of the first sifting machine, and the first sieve sheet is located at upper stream of the second sieve sheet;
   supplying a first raw material from a first raw material supplier to the first sieve sheet of the first sifting machine,
   supplying a second raw material from a second raw material supplier to the second sieve sheet of the first sifting machine,
   vibrating the first and second sieve sheets so that the first raw material falls downwardly through the mesh of the first sieve portion, and a part of the first raw material, which did not pass through the mesh of the first sieve sheet and the second raw material fall downwardly through the mesh of the second sieve sheet;
   forming a first surface layer of the building material by allowing the first raw material to fall downwardly through the mesh of the first sieve sheet and accumulate onto the template; and
   forming a first core layer of the building material by allowing the part of the first raw material which did not pass through the mesh of the first sieve sheet and the second raw material to fall downwardly through the mesh of the second sieve sheet and accumulate onto the first surface layer formed on the template.

2. The method for manufacturing a multi-layered building material of claim 1, further comprising:
   supplying a third raw material from a third raw material supplier onto a fourth sieve sheet of a second sifting machine having a third sieve sheet and the fourth sieve sheet, the third sieve sheet having a coarser mesh than the fourth sieve sheet, and the second sifting machine located at downstream of the first sifting machine and arranged to be inclined along the predetermined direction, in which the template is moved, so that an upper stream portion is lower than a downstream portion of the second sifting machine, the third sieve sheet is located at upper stream of the fourth sieve sheet in the predetermined direction, the third raw material moves downwardly from the fourth sieve sheet to the third sieve sheet, and the template is further moved in the predetermined direction under the second sifting machine;
   vibrating the third and fourth sieve sheets so that the third raw material falls downwardly through the mesh of the fourth sieve sheet, and a part of the third raw material which did not pass through the mesh of the fourth sieve sheet falls downwardly through the mesh of the third sieve sheet;
   forming a second core layer of the building material by allowing the third raw material to fall downwardly through the mesh of the third sieve sheet and accumulate onto the first core layer formed in the template; and forming a second surface layer of the building material by allowing the third raw material to fall downwardly through the mesh of the fourth sieve sheet and accumulate onto the second core layer formed in the template.

* * * * *